(12) United States Patent
Makal et al.

(10) Patent No.: US 9,650,477 B2
(45) Date of Patent: May 16, 2017

(54) CROSSLINKABLE THERMOPLASTIC POLYURETHANE

(71) Applicant: Lubrizol Advanced Materials, Inc., Cleveland, OH (US)

(72) Inventors: Umit G. Makal, Stow, OH (US); George H. Loeber, Elyria, OH (US); Louis J. Brandewiede, Chagrin Falls, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 108 days.

(21) Appl. No.: 14/519,275

(22) Filed: Oct. 21, 2014

(65) Prior Publication Data
US 2015/0034361 A1 Feb. 5, 2015

Related U.S. Application Data

(62) Division of application No. 13/010,847, filed on Jan. 21, 2011, now Pat. No. 8,865,052.
(Continued)

(51) Int. Cl.
C08J 5/00 (2006.01)
C08G 18/68 (2006.01)
(Continued)

(52) U.S. Cl.
CPC ............... C08J 5/00 (2013.01); B29C 71/04 (2013.01); C08G 18/6607 (2013.01);
(Continued)

(58) Field of Classification Search
CPC ..... C08J 5/00; C08J 23/7508; C08G 18/6607; C08G 18/676; C08G 18/68; H01B 3/302; H01B 13/148; H01B 7/295; B29C 71/04
(Continued)

(56) References Cited

U.S. PATENT DOCUMENTS 4,131,731 A 12/1978 Lai et al.
4,133,723 A 1/1979 Howard
(Continued)

FOREIGN PATENT DOCUMENTS

CN 101519479 A 9/2009
EP 0422500 A1 4/1991
(Continued)

*Primary Examiner* — Sanza McClendon
(74) *Attorney, Agent, or Firm* — Thoburn T. Dunlap

(57) ABSTRACT

The TPU of this invention contains unsaturation in its polymeric backbone. The unsaturation can be present in the soft segment or in the hard segment or in both the soft and hard segments of the TPU. The TPU can be molded like a thermoplastic, and can be subsequently crosslinked by exposure to electron beam irradiation into thermoset articles having excellent chemical resistance, dimensional stability, set properties, heat resistance, oxidative resistance, and creep resistance. In one embodiment, the TPUs of this invention are the reaction product (1) a hydroxyl terminated intermediate, (2) a polyisocyanate, (3) a saturated glycol chain extender, and (4) a glycol chain extender containing carbon-carbon double bonds, such as the allyl moieties present in trimethylolpropane monoallyl ether. In another embodiment of this invention, the thermoplastic polyurethane which is crosslinkable by e-beam irradiation is comprised of the reaction product of (1) a saturated hydroxyl terminated intermediate, (2) an unsaturated hydroxyl terminated intermediate, wherein the unsaturated hydroxyl terminated intermediate contains carbon-carbon double bonds, (3) a polyisocyanate, and (4) a saturated glycol chain extender.

7 Claims, 2 Drawing Sheets

Related U.S. Application Data

(60) Provisional application No. 61/297,434, filed on Jan. 22, 2010.

(51) Int. Cl.
*C08G 18/67* (2006.01)
*C08G 18/66* (2006.01)
*B29C 71/04* (2006.01)
*H01B 3/30* (2006.01)
*H01B 7/295* (2006.01)
*H01B 13/14* (2006.01)
*B29K 75/00* (2006.01)
*B29K 105/24* (2006.01)

(52) U.S. Cl.
CPC ........... *C08G 18/676* (2013.01); *C08G 18/68* (2013.01); *H01B 3/302* (2013.01); *H01B 7/295* (2013.01); *H01B 13/148* (2013.01); *B29K 2075/00* (2013.01); *B29K 2105/24* (2013.01); *B29K 2995/0016* (2013.01); *C08J 2375/08* (2013.01)

(58) Field of Classification Search
USPC ....... 522/90, 98, 150, 151 m, 152, 173, 174; 528/44, 59, 65, 75; 525/418, 419, 437, 525/440.01, 440.07, 440.072; 264/485, 264/488, 479, 494, 495
See application file for complete search history.

(56) References Cited

U.S. PATENT DOCUMENTS

| | | |
|---|---|---|
| 4,507,458 A | 3/1985 | Shiraki et al. |
| 4,560,456 A | 12/1985 | Heil et al. |
| 5,098,982 A | 3/1992 | Long, II |
| 5,334,420 A | 8/1994 | Hartung et al. |
| 5,349,040 A | 9/1994 | Trinks et al. |
| 2009/0100723 A1 | 4/2009 | Farkas et al. |
| 2011/0079427 A1* | 4/2011 | Powale ............... H01B 3/427 174/72 A |

FOREIGN PATENT DOCUMENTS

| | | |
|---|---|---|
| EP | 1489120 A1 | 12/2004 |
| WO | 2007/144292 S1 | 12/2007 |

* cited by examiner

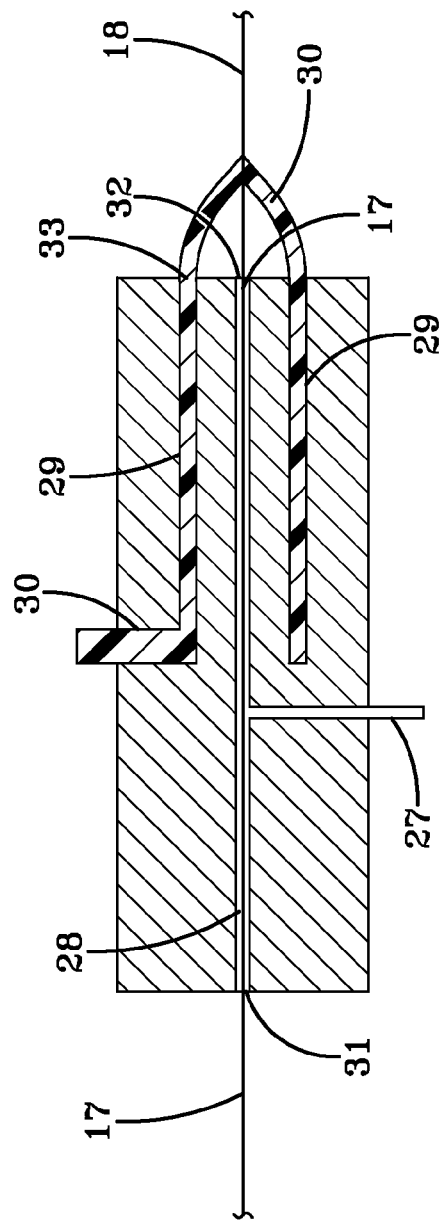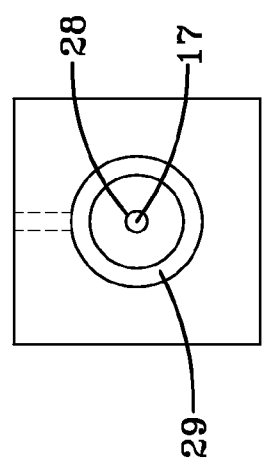

CROSSLINKABLE THERMOPLASTIC POLYURETHANE

CROSS REFERENCE TO RELATED APPLICATION

This application is a divisional application of application Ser. No. 13/010,847 filed on Jan. 21, 2011, now granted as U.S. Pat. No. 8,865,052 on Oct. 21, 2014, which claims benefit of Provisional Application Ser. No. 61/297,434 filed on Jan. 22, 2010.

FIELD OF THE INVENTION

The present invention relates to thermoplastic polyurethane (TPU) compositions that can be formed into useful articles by injection molding, blow molding, or extrusion and which can subsequently be crosslinked. In one embodiment, crosslinking of the TPU is effected by exposing crosslinkable moieties polymerized into the TPU to electron beam irradiation. Thermoset articles having excellent chemical resistance, dimensional stability, set properties, heat resistance, oxidative resistance, and creep resistance are formed from the crosslinked TPUs.

BACKGROUND OF THE INVENTION

TPUs (thermoplastic polyurethanes) are currently being used in manufacturing a wide variety of products for many applications by various melt processing techniques, such as injection molding and extrusion. For instance, TPUs are commonly used in making seals, gaskets, catheters, wires and cables. Such TPUs are typically made by reacting (1) a hydroxyl terminated polyether or hydroxyl terminated polyester, (2) a chain extender, and (3) an isocyanate compound. Various types of compounds for each of the three reactants are disclosed in the literature. Such TPUs are segmented polymers having soft segments and hard segments. This feature accounts for their excellent elastic properties. The soft segments are derived from the hydroxyl terminated polyether, polyester, polycarbonate, or polycaprolactone and the hard segments are derived from the isocyanate and the chain extender. The chain extender is typically one of a variety of glycols, such as 1,4-butanediol. For instance, U.S. Pat. No. 5,959,059 discloses a TPU made from a hydroxyl terminated polyether, a glycol chain extender, and a diisocyanate. This TPU is described as being useful for making fibers, golf ball cores, recreational wheels, and other uses.

In many applications, it is desirable or even critical for the TPU utilized in manufacturing articles to exhibit good chemical resistance, dimensional stability, set properties, heat resistance, oxidative resistance, and creep resistance. These physical and chemical characteristics are important in articles that are exposed to chemicals, solvents, and/or elevated temperatures. For instance, it is normally important for seals, gaskets, wires and cables that are used in industrial applications to possess these desirable characteristics. This is particularly the case in under-the-hood automotive applications where the part made with the TPU may well be exposed to elevated temperatures and organic liquids, such as gasoline and motor oil. For example, spark plug wires and other wires used in automotive applications need to be both oil and heat resistant. Seals and gaskets used in internal combustion engines, heavy equipment, appliances, and countless other applications also need to be resistant to heat and solvents.

Crosslinking a thermoplastic polymer into a thermoset network is one known technique for improving chemical resistance, dimensional stability, set properties, heat resistance, oxidative resistance, and creep resistance. However, thermoset resins cannot be processed using standard melt processing techniques, such as injection molding, blow molding, and extrusion. In general, thermosets are molded into the desired form and cured into the shape of the mold via a more labor intensive, time consuming, and expensive curing technique. Additionally, defective thermoset parts and scrap cannot be recycled and remolded like thermoplastics. This leads to polymer waste which also adds to total cost and has a detrimental environmental impact.

There is a need for a TPU that can be melt processed into a desired shape by injection molding, blow molding, extrusion, or the like, and then crosslinked into a thermoset network. It is, of course, important for the thermoset network to exhibit good chemical, solvent, and heat resistance which is characterized by good dimensional stability, set properties, oxidative resistance, and creep resistance. Such a TPU could beneficially be used in manufacturing a wide array of component parts and articles of manufacture having improved chemical and physical characteristics. For instance, such a polymer could be advantageously utilized in manufacturing seals, gaskets, wires, cables, hoses, pipes, tubes, and other industrial and consumer products that have improved chemical, solvent, and heat resistance. There is, accordingly, a need for a TPU composition that can be molded into useful articles like a thermoplastic but which has the desirable physical and chemical properties of a thermoset TPU.

SUMMARY OF THE INVENTION

The TPU of this invention contains a small amount of unsaturation in its polymeric backbone, can be molded like a thermoplastic, and can be subsequently crosslinked by exposure to electron beam irradiation into thermoset articles having excellent chemical resistance, dimensional stability, set properties, heat resistance, oxidative resistance, and creep resistance. The TPUs of this invention are the reaction product of (1) a hydroxyl terminated intermediate, (2) a polyisocyanate, (3) a saturated glycol chain extender, and (4) a glycol chain extender containing carbon-carbon double bonds.

The present invention further discloses a process for manufacturing a molded article which comprises (a) heating a thermoplastic polyurethane composition to a temperature which is above the melting point of the thermoplastic polyurethane composition, wherein the thermoplastic polyurethane composition is comprised of the reaction product of (1) a hydroxyl terminated intermediate, (2) a polyisocyanate, (3) a saturated glycol chain extender, and (4) a glycol chain extender containing carbon-carbon double bonds; (b) injecting the thermoplastic polyurethane composition into a mold; (c) cooling the thermoplastic polyurethane composition in the mold to a temperature which is below the melting point of the thermoplastic polyurethane composition to produce the molded article; (d) removing the molded article from the mold; and (e) exposing the molded article to electron beam irradiation to crosslink the thermoplastic polyurethane composition into a thermoset.

The subject invention also reveals a process for manufacturing a thermoset tube which comprises (a) heating a thermoplastic polyurethane composition to a temperature which is above the melting point of the thermoplastic polyurethane composition, wherein the thermoplastic polyurethane composition is comprised of the reaction product of (1) a hydroxyl terminated intermediate, (2) a polyisocyanate, (3) a saturated glycol chain extender, and (4) a glycol chain extender containing carbon-carbon double bonds; (b) extruding the thermoplastic polyurethane composition into a hot extruded tube; (c) cooling the hot extruded tube to below the melting point of the thermoplastic polyurethane composition to produce an uncured extruded tube; and (d) exposing the uncured extruded tube to electron beam irradiation to crosslink the thermoplastic polyurethane composition into a thermoset and to produce the thermoset tube.

The present invention further discloses a process for manufacturing a coated electrical wire which comprises (a) passing a metal wire through a tubing type cross-head die; (b) extruding a thermoplastic polyurethane composition which is comprised of the reaction product of (1) a hydroxyl terminated intermediate, (2) a polyisocyanate, (3) a saturated glycol chain extender, and (4) a glycol chain extender containing carbon-carbon double bonds into a tube which surrounds the metal wire which is exiting the tubing type cross-head die at a speed lower than that at which the wire is exiting the tubing type cross-head die; (c) applying a vacuum to the die cavity so as to cause the tube of thermoplastic polyurethane composition to collapse onto the wire as it exits the tubing type cross-head die to produce a wire having an uncured coating thereon; and (d) exposing the wire having the uncured coating thereon to electron beam irradiation to crosslink the thermoplastic polyurethane composition into a thermoset and to produce the coated electrical wire.

In another embodiment of this invention, double bonds are incorporated into the thermoplastic polyurethane composition by polymerizing a hydroxyl terminated intermediate that contains double bonds into the backbone of the polymer. The subject invention accordingly further reveals a thermoplastic polyurethane that is crosslinkable with e-beam radiation, wherein the thermoplastic polyurethane is comprised of the reaction product of (1) a saturated hydroxyl terminated intermediate, (2) an unsaturated hydroxyl terminated intermediate, wherein the unsaturated hydroxyl terminated intermediate contains carbon-carbon double bonds, (3) a polyisocyanate, and (4) a saturated glycol chain extender.

In a further embodiment of this invention, double bonds are incorporated into the thermoplastic polyurethane by using small amounts of both a hydroxyl terminated intermediate containing double bonds and a glycol chain extender containing double bonds. In this embodiment the TPU, that is crosslinkable with e-beam radiation, is comprised of the reaction product of (1) a saturated hydroxyl terminated intermediate, (2) an unsaturated hydroxyl terminated intermediate, wherein the unsaturated hydroxyl terminated intermediate contains carbon-carbon double bonds, (3) a saturated glycol chain extender, (4) a glycol chain extender containing carbon-carbon double bonds, and (5) a polyisocyanate. This embodiment allows crosslinking to occur in both the hard and soft segments of the TPU polymer.

The TPU compositions of this invention are of particular value when used in making articles that benefit from improved chemical resistance, dimensional stability, set properties, heat resistance, oxidative resistance, and/or creep resistance. These crosslinkable TPUs can for instance be utilized in manufacturing flame retardant articles and composite structures.

BRIEF DESCRIPTION OF THE DRAWINGS

The TPU of this invention can be utilized to coat electrical wires using the apparatus illustrated in the accompanying drawings.

FIG. 2 is a cross-sectional view of the tubing type cross-head die taken along line 2-2 of FIG. 1.

FIG. 3 is an end view of the tubing type cross-head die illustrated in FIG. 3 which shows the end of the die at which the coated wire exits.

DETAILED DESCRIPTION OF THE INVENTION

Figure 1:
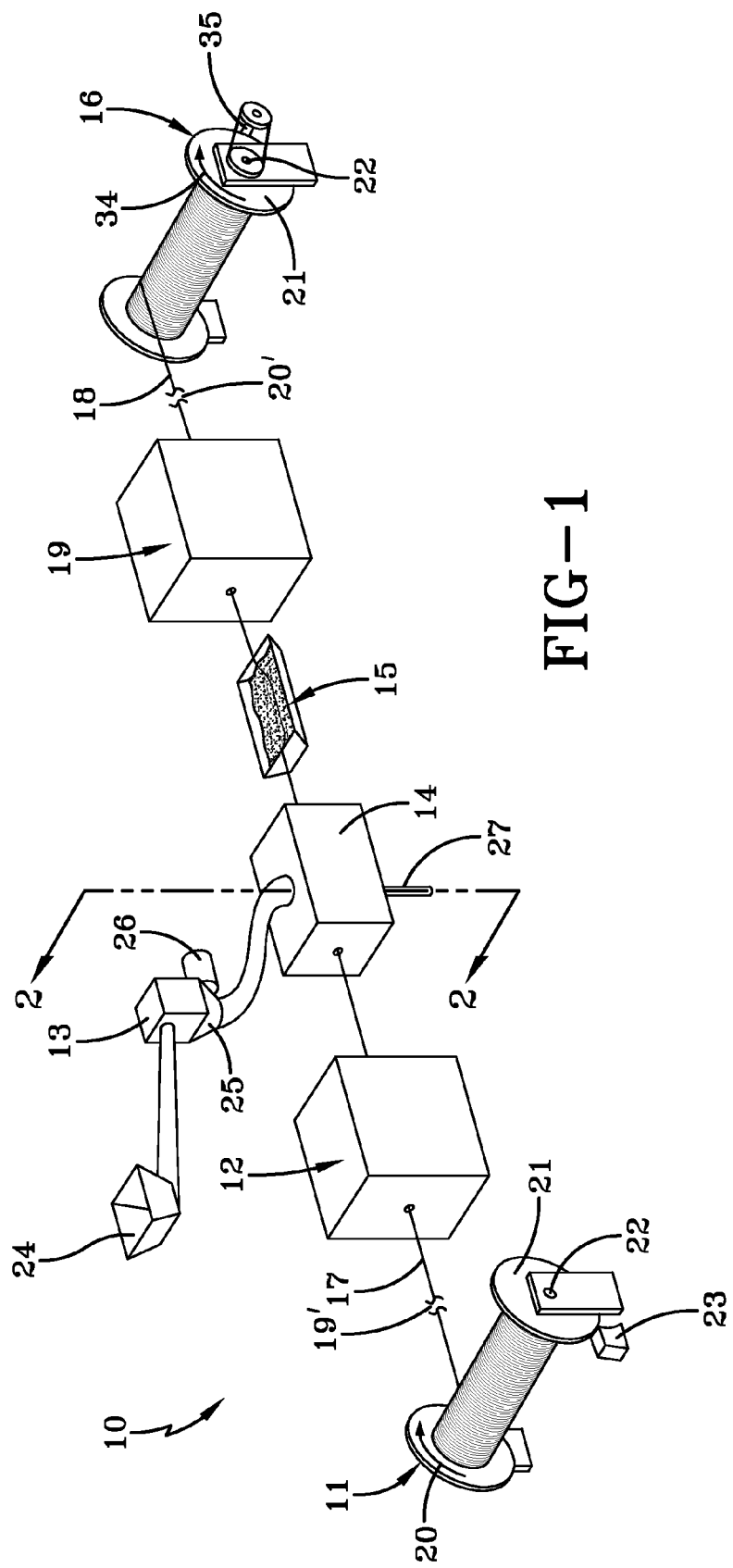
FIG. 1 is a perspective, fragmentary and diagrammatic view of an apparatus that can be used to coat metal wires in accordance with one embodiment of this invention.

The thermoplastic polyurethane of this invention contains unsaturation in its backbone that is capable of reacting to form crosslinks to produce a thermoset network. This unsaturation is introduced by incorporating glycols that contain carbon-carbon double bonds into the polymer as part of the chain extender or the hydroxyl terminated intermediate may have carbon-carbon double bonds. In some embodiments, both the chain extender (hard segment component) and the hydroxyl terminated intermediate (soft segment component) have double bonds. This allows crosslinking to occur in both the hard and soft segments of the TPU. These glycol chain extenders that contain carbon-carbon double bonds are typically in the form of allyl moieties, such as those present in trimethylolpropane monoallyl ether. In any case, when irradiated with e-beam radiation, the carbon-carbon double bonds within the TPU react together to produce crosslinks between different polymer chains in the TPU thus producing a crosslinked thermoset. The crosslinking used in curing the TPU can be generated by exposure to electron beam irradiation, gamma rays, ultraviolet light (in the case of relatively clear polymeric formulations), or by chemical free radical generators such as aliphatic and aromatic peroxides, azo compounds, photo initiators, etc.

The thermoplastic polyurethane of this invention can be the reaction product of (1) a hydroxyl terminated intermediate, (2) a polyisocyanate, and (3) a saturated glycol chain extender, and (4) a glycol chain extender containing carbon-carbon double bonds. The technique under which these reactants are polymerized to synthesize the thermoplastic polyurethane is conducted utilizing conventional equipment, catalysts, and procedures. However, the polymerization is conducted in a manner that will result in the desired polymer characteristics and the needed molecular weight. The types and levels of hydroxyl terminated intermediate, polyisocyanate, and saturated glycol chain extender will be adjusted to attain the desired set of chemical and physical characteristics for the polymer being synthesized. The polymerization technique utilized in making the TPUs of this invention are accordingly conventional except for the fact that a glycol chain extender containing carbon-carbon double bonds is substituted for a portion of the saturated glycol chain extender that would normally be used in making the polymer.

The hydroxyl terminated intermediate (soft segment components) used in making the thermoplastic polyurethane is a hydroxyl terminated polyether intermediate, a hydroxyl terminated polyester intermediate, a hydroxyl terminated polycarbonate intermediate, a hydroxyl terminated polycaprolactone intermediate, and mixtures thereof. To inhibit crystallization, the hydroxyl terminated intermediate can be (1) comprised of repeat units that are derived from a branched glycol or (2) is a random copolyether or a random copolyester. For example, a hydroxyl terminated random copolyether intermediate can be synthesized by reacting two different alkyl diols or glycols with an alkylene oxide. In the alternative, the alkyl diol or glycol can be branched to inhibit crystallization.

The alkyl diols or glycols used in making the hydroxyl terminated polyether intermediate will typically contain from 2 to 12 carbon atoms and the alkylene oxide will typically contain from 2 to 6 carbon atoms. The glycols that can be used in making the hydroxyl terminated polyester intermediate can be aliphatic, aromatic, or combinations thereof, and normally contain a total of from 2 to 8 carbon atoms. Some representative examples of glycols that can be used include ethylene glycol, 1,2-propanediol, 1,3-propanediol, 1,3-butanediol, 1,4-butanediol, 1,5-pentanediol, 1,6-hexanediol, 2,2-dimethyl-1,3-propanediol, 1,4-cyclohexanedimethanol, decamethylene glycol, dodecamethylene glycol, and the like. Some suitable glycols include ethylene glycol, 1,3-propanediol and 1,4-butanediol. Ethylene oxide and propylene oxide are representative examples of alkylene oxides that can be used in synthesizing the hydroxyl functional polyether intermediate.

A hydroxyl functional random copolyether intermediate that is useful in the practice of this invention can be produced by first reacting propylene glycol with propylene oxide followed by subsequent reaction with ethylene oxide. This results in the formation of poly(propylene-ethylene) glycol. Some representative examples of additional useful hydroxyl functional polyether polyols include poly(ethylene)glycol, poly(propylene)glycol, and poly(tetramethylene ether)glycol, and the like. Poly(tetramethylene ether)glycol is a suitable hydroxyl functional polyether polyol for use in making the thermoplastic polyurethanes of this invention.

Hydroxyl terminated random copolyester intermediates can be synthesized through (1) an esterification reaction of two different alkyl diols or glycols with one or more dicarboxylic acids or anhydrides, or (2) a transesterification reaction of two different alkyl diols or glycols with one or more esters of dicarboxylic acids. In the alternative, the alkyl diol or glycol can be branched to inhibit crystallization of the hydroxyl terminated copolyester intermediate.

The diols or glycols used in making the hydroxyl terminated polyester intermediate are the same as the diols or glycols that can be used in synthesizing the hydroxyl terminated polyether intermediate. The dicarboxylic acids used in making the hydroxyl terminated copolyester intermediate can be aliphatic, cycloaliphatic, aromatic, or combinations thereof. Suitable dicarboxylic acids which may be used alone or in mixtures generally have a total of from 4 to 15 carbon atoms and include: succinic acid, glutaric acid, adipic acid, pimelic acid, suberic acid, azelaic acid, sebacic acid, dodecanedioic acid, phthalic acid, isophthalic acid, terephthalic acid, 2,6-naphthalene dicarboxylic acid, 1,4-cyclohexanedicarboxylic acid, and the like. Adipic acid is a suitable acid for use. Anhydrides of the above dicarboxylic acids, such as phthalic anhydride, tetrahydrophthalic anhydride, or the like, can also be used to synthesize the intermediate by a transesterification reaction as previously explained. Some representative examples of useful hydroxyl functional random copolyester polyols include poly(butylene hexylene adipate)glycol, poly(ethylene hexylene adipate)glycol, polypropylene hexylene adipate)glycol, poly(ethylene butylene adipate)glycol, poly(butylene hexylene succinate)glycol, poly(butylene hexylene glutarate)glycol, poly(butylene hexylene pimelate)glycol, poly(butylene hexylene azelate)glycol, poly(butylene hexylene terephthalate) glycol, poly(butylene hexylene isophthalate)glycol, and the like. Poly (butylene hexylene adipate)glycol is a suitable hydroxyl functional copolyester polyol for utilization in synthesizing many TPUs in accordance with the practice of this invention.

The hydroxyl terminated polyether intermediate or the hydroxyl terminated polyester intermediate used in making the thermoplastic polyurethanes of this invention will typically have a number average molecular weight (Mn), as determined by assay of the terminal functional groups, which is within the range of about 350 to about 10,000 in one aspect, from about 500 to about 5,000 in another aspect, from about 700 to about 4,000 in a further aspect, and from about 1,000 to about 3,000 in a still further aspect. A blend of two or more hydroxyl terminated intermediates may be used to make the TPU of this invention.

The hydroxyl terminated polycarbonate intermediates are commercially available from Stahl USA of Peabody, Mass. Suitable hydroxyl terminated polycarbonates can be prepared by reacting a glycol with a carbonate. U.S. Pat. No. 4,131,731, incorporated herein by reference, describes hydroxyl terminated polycarbonates, their preparation and how they can be utilized. Such polycarbonates are typically linear. The number average molecular weight of the hydroxyl terminated polycarbonates is generally at least about 500 and typically not more than 3,000.

The hydroxyl terminated polycaprolactone intermediates are commercially available from companies such as, for example, Perstorp Polyols, Inc., Toledo, Ohio. Hydroxyl terminated polycaprolactones can be formed by reaction of a caprolactone with a glycol. Suitable caprolactones include ε-caprolactone and methyl ε-caprolactone. Suitable glycols include, for example, ethylene glycol, 1,2-propanediol, 1,3-propanediol, 1,3-butanediol, 1,4-butanediol, 1,5-pentanediol, 1,6-hexanediol, 2,2-dimethyl-1,3-propanediol, 1,4-cyclohexanedimethanol, decamethylene glycol, dodecamethylene glycol, and the like. Methods for the preparation of hydroxyl terminated polycaprolactones are generally known to those of ordinary skill in the art.

The polyisocyanate used in synthesizing the thermoplastic polyurethane can be selected from a diisocyanate. While aliphatic diisocyanates can be utilized, aromatic diisocyanates are typically used in making polymers for most applications. Moreover, the use of multifunctional isocyanate compounds, i.e., triisocyanates, etc., which cause undesirable premature crosslinking, are generally avoided and thus the amount used, if any, is generally less than 4 mole percent in one aspect and less than 2 mole percent in another aspect, based upon the total moles of all of the various isocyanates used. Suitable diisocyanates include aromatic diisocyanates such as: 4,4'-methylenebis(phenyl isocyanate) (MDI); m-xylene diisocyanate (XDI), phenylene-1,4-diisocyanate, naphthalene-1,5-diisocyanate, diphenylmethane-3,3'-dimethoxy-4,4'-diisocyanate, and toluene diisocyanate (TDI); as well as aliphatic diisocyanates such as isophorone diisocyanate (IPDI), 1,4-cyclohexyl diisocyanate (CHDI), decane-1,10-diisocyanate, and dicyclohexylmethane-4,4'-diisocyanate. Dimers and trimers of the above diisocyanates may also be used as well as a blend of two or more diisocyanates may be used.

The polyisocyanate used in this invention may be in the form of a low molecular weight polymer or oligomer which is end capped with an isocyanate. For example, the hydroxyl terminated polyether intermediate described above may be reacted with an isocyanate-containing compound to create a low molecular weight polymer end capped with isocyanate. In the TPU art, such materials are normally referred to as pre-polymers. Such pre-polymers normally have a number average molecular weight (Mn) which is within the range of about 500 to about 10,000.

The mole ratio of the one or more diisocyanates is generally from about 0.95 to about 1.05 in one aspect, and from about 0.98 to about 1.03 moles per mole in another aspect, of the total moles of the one or more hydroxyl terminated intermediates and the one or more chain extenders.

The glycol chain extender used in making the thermoplastic polyurethane of this invention will be a combination of a saturated glycol chain extender and glycol chain extender containing carbon-carbon double bonds (unsaturated glycol chain extender). The unsaturated glycol chain extender will typically represent about 2 weight percent to about 100 weight percent of the total amount of chain extender utilized in synthesizing the TPU of this invention. The total amount of chain extender is, of course, the sum of the total amount of saturated glycol and unsaturated glycol used in making the TPU. Thus, in this scenario, the unsaturated glycol chain extender will represent about 2 weight percent to about 100 weight percent and the saturated glycol chain extender will represent about 0 weight percent to about 98 weight percent of the total chain extender utilized in synthesizing the polymer. The unsaturated glycol chain extender will more typically represent about 5 weight percent to about 50 weight percent of the total amount of chain extender utilized in synthesizing the TPU. The unsaturated glycol chain extender will most typically represent about 8 weight percent to about 50 weight percent of the total amount of chain extender utilized in synthesizing the TPU. The unsaturated glycol will normally represent from about 0.5 weight percent to about 20 weight percent of the total weight of the TPU (total weight of hydroxyl terminated intermediate, polyisocyanate, saturated glycol chain extender, and unsaturated glycol chain extender). The unsaturated glycol will more typically represent from about 1 weight percent to about 10 weight percent of the total weight of the TPU. In another aspect, the unsaturated glycol will represent from about 1.5 weight percent to about 5 weight percent of the total weight of the TPU.

The saturated chain extender that can be used in synthesizing the TPUs of this invention include organic diols or glycols having from 2 to about 20 carbon atoms, such as alkane diols (straight chained and branched), cycloaliphatic diols, alkylaryl diols, and the like. Alkane diols which have a total from about 2 to about 12 carbon atoms are often utilized. Some representative examples of alkane diols that can be used include ethanediol, propane glycol, 1,6-hexanediol, 1,3-butanediol (1,3-BDO), 1,5-pentanediol, neopentylglycol (NPG), 2-butyl-2-ethyl-1,3-propanediol, 2,4-diethyl-1,5-pentanediol, 3-methyl-1,5-pentanediol, and 1,4-butanediol. Dialkylene ether glycols, such as diethylene glycol and dipropylene glycol, can also be used as the chain extender. Examples of suitable cycloaliphatic diols include 1,2-cyclopentanediol, 1,4-cyclohexanedimethanol (CHDM) and the like. Examples of suitable alkylaryl diols include hydroquinone bis(β-hydroxyethyl)ether (HQEE), 1,4-benzenedimethanol, bisethoxy biphenol, bisphenol A ethoxylates, bisphenol F ethoxylates and the like. Still other suitable chain extenders are 1,3-bis(2-hydroxyethyl)benzene, and 1,2-bis(2-hydroxyethoxy)benzene. Mixtures of the above noted chain extenders can also be utilized.

Saturated chain extenders with a functionality of greater than 2 may also be used with the proviso that the resulting polymer retains the desired thermoplastic nature and other desired chemical and physical characteristics. Examples of such multifunctional chain extenders include trimethylolpropane, glycerin, and pentraerythritol. Normally, multifunctional chain extenders are used in conjunction with difunctional chain extenders to introduce a limited amount of chain branching. Accordingly, the level of multifunctional chain extenders typically does not exceed 10 mole percent of the total amount of chain extenders used in making the thermoplastic polyurethane. It is more typical for the level of multifunctional saturated chain extenders to be limited to being within the range of 0.5 mole percent to 5 mole percent based upon the total amount of chain extenders used in making the TPU. In many cases, the TPU will be void of chain extenders having a functionality greater than 2. In any case, saturated difunctional chain extenders will typically represent at least about 90 mole percent of the total amount of saturated chain extenders used in synthesizing the TPU.

The saturated linear chain extenders that can be utilized for use in making the TPUs of this invention can be represented by the structural formula:

wherein n represents an integer from 2 to 20 and wherein n typically represents an integer from 2 to 12. Accordingly, the linear chain extender will typically be selected from the group consisting of ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, and 1,12-dodecanediol. However, it should be appreciated that various mixtures of diols can be utilized as the chain extender in the practice of this invention.

The unsaturated glycol chain extenders used in making the TPUs of this invention are typically of the structural formula:

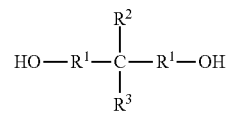

wherein $R^1$ groups can be the same or different and represent alkylene groups that contain from 1 to about 5 carbon atoms, wherein $R^2$ represents a hydrogen atom or an alkyl group containing from 1 to about 5 carbon atoms, and wherein $R^3$ represents an unsaturated hydrocarbyl group containing from 2 to about 10 carbon atoms. $R^1$ will typically represent a divalent alkylene group that contains from 1 to 7 carbon atoms in one aspect of the invention and from 1 to 3 carbon atoms in another aspect. In still another aspect $R^1$ can be represented by the formula: $-(CH_2)_{n'}-$. In many cases, $R^1$ can be a methylene group. $R^2$ will typically represent a methyl, an ethyl, an isopropyl group, or a normal-propyl group. $R^3$ is typically a monoallyl ether group, such as a monoallyl ether group of the structural formula: $-(CH_2)_{n'}-O-CH_2-CH=CH_2$, wherein n' in the formulae above represents an integer from 1 to about 7 in one aspect and from 1 to 3 in another aspect. It is typical for n' to represent an integer from 1 to 3.

In one aspect, the unsaturated glycol chain extender for utilization in the practice of this invention is trimethylolpropane monoallyl ether. Trimethylolpropane monoallyl ether is of the structural formula:

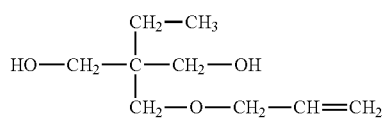

and is commercially available from a variety of sources.

In the embodiment of this invention where a hydroxyl terminated intermediate that contains carbon-carbon double bonds is utilized to introduce double bonds into the TPU it will be utilized in conjunction with a saturated hydroxyl terminated intermediate in synthesizing the TPU. In other words, the hydroxyl terminated intermediate used in making the TPU will be a mixture of saturated and unsaturated hydroxyl terminated intermediates. The unsaturated hydroxyl terminated intermediate will normally constitute 1 to 100 weight percent of the total hydroxyl terminated intermediate with the saturated hydroxyl terminated intermediate representing 0 weight percent to 99 weight percent of the total hydroxyl terminated intermediate. In most cases, the unsaturated hydroxyl terminated intermediate will constitute 20 to 40 weight percent of the total hydroxyl terminated intermediate with the saturated hydroxyl terminated intermediate representing 60 weight percent to 80 weight percent of the total hydroxyl terminated intermediate. In one aspect, the unsaturated hydroxyl terminated intermediate constitutes 5 to 30 weight percent of the total hydroxyl terminated intermediate with the saturated hydroxyl terminated intermediate representing 70 weight percent to 95 weight percent of the total hydroxyl terminated intermediate.

In one aspect of the invention, the unsaturated hydroxyl terminated intermediate utilized in making such TPUs are typically of the structural formula:

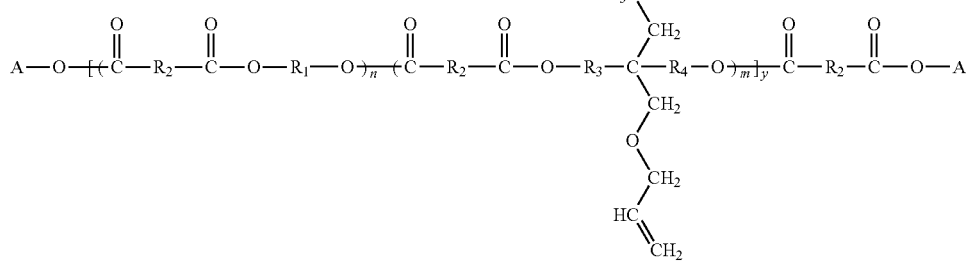

wherein A independently represents —R$_1$OH and a moiety selected from the structure represented as follows:

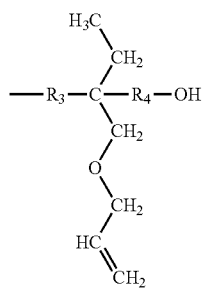

wherein R$_1$, R$_2$, R$_3$ and R$_4$ can be the same or different and represent divalent linear and branched alkylene moieties that contain from 1 to about 10 carbon atoms. In one aspect, R$_1$, R$_2$, R$_3$ and R$_4$ independently are selected from methylene, ethylene, propylene, butylene, pentylene, and hexylene moieties. In another aspect, R$_1$ and R$_2$ can contain 4 carbon atoms (e.g., butylene) with R$_3$ and R$_4$ containing 1 carbon atom (e.g., methylene). In still another aspect, R$_1$ is a divalent ether group represented by —R$_5$—O—R$_5$—, wherein R$_5$ independently is selected from a divalent alkylene moiety containing 1 to 5 carbon atoms, and R$_2$, R$_3$ and R$_4$ are as defined above. In one aspect of the invention, the ratio of n:m ranges from about 0 to about 35, from about 1 to about 30 in another aspect, from about 5 to about 25 in still another aspect, and from about 10 to about 20 in a further aspect; and y is an integer ranging from about 1 to about 20.

In another aspect of the invention, the unsaturated hydroxyl terminated intermediate is the reaction product of the following components:

a) from about 1.5 mole % to about 55 mole % of an unsaturated chain extender selected from a compound represented by the formula:

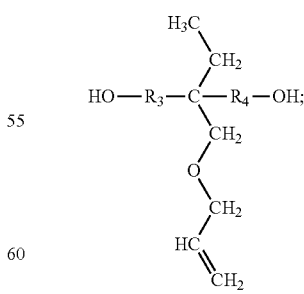

b) from about 0 mole % to about 50 mole % of a diol selected from a compound represented by the formula:

c) from about 45 to about 49 mole % of a diacid represented by the formula:

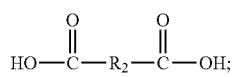

wherein $R_1$, $R_2$, $R_3$, and $R_4$ are as previously defined. It will be recognized by the skilled artisan that the total amount of each of the components making up the unsaturated hydroxyl terminated intermediate will not exceed 100 mole %.

A suitable unsaturated chain extender is trimethylolpropane monoallyl ether (TMPME).

Suitable diols include but are not limited to ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, and mixtures thereof.

Suitable dicarboxylic acids which may be used alone or in mixtures generally include but are not limited to succinic acid, glutaric acid, adipic acid, pimelic acid, suberic acid, azelaic acid, sebacic acid, phthalic acid, isophthalic acid, terephthalic acid, 1,4-cyclohexanedicarboxylic acid, and the like. Anhydrides of the above dicarboxylic acids, such as phthalic anhydride, tetrahydrophthalic anhydride, or the like, can also be used to synthesize the intermediate by a transesterification reaction as previously discussed.

In one aspect, the unsaturated hydroxyl terminated intermediate can be made by placing an unsaturated chain extender, a diol, and a diacid in a reactor under agitation, heating the reaction medium between about 120° C. to about 200° C. at ambient pressure for about 3 to 8 hours, and removing any water that is generated. A transesterification catalyst such as tetra-(2-ethylhexyl)titanate is added and a vacuum (0-15 mm Hg) is optionally applied to the reaction medium to catalyze the reaction. The reaction medium is heated between about 180° C. to about 210° C. and generated water is continually removed until an acid number below about 0.5 is obtained.

The glycol chain extender containing carbon-carbon double bonds (unsaturated glycol chain extender) and/or the unsaturated hydroxyl terminated intermediate containing carbon-carbon double bonds can also be used to make a very rigid TPU, often referred to as an engineering resin. The very rigid TPU is made by reacting a polyisocyanate with a glycol chain extender, and optionally up to 15 weight percent of polyol (hydroxyl terminated intermediate). In one aspect, the very rigid TPU contains less than 5 weight percent polyol, and in another aspect zero polyol is present in the very rigid TPU polymer. The very rigid TPU polymer has a durometer hardness of greater than 60 Shore D in one aspect, greater than 80 Shore D in another aspect, and about 85 Shore D in a further aspect. The glycol chain extenders, hydroxyl terminated intermediates, and polyisocyanate used are the same as described above. The very rigid TPU polymer is made up of predominately hard block segments in one aspect and is all hard blocks in another aspect, if no hydroxyl terminated intermediate is used. These types of TPU polymers, without the carbon-carbon double bonds and thus uncrosslinked are commercially available from Lubrizol Advanced Materials, Inc. under the designation of Isoplast® and HS-85 brands.

By substituting a portion of the saturated glycol chain extender with the glycol chain extender containing carbon-carbon double bonds and/or by substituting a portion of the saturated hydroxyl terminated intermediate (if used) with the unsaturated hydroxyl terminated intermediate, the rigid TPU becomes able to be crosslinked by exposure to e-beam radiation. The crosslinked rigid TPU will have enhanced properties, such as reduced set, reduced creep, and enhanced chemical resistance. Such rigid products are useful in many applications, such as medical applications and industrial applications. Dental retainer moldings are an example of the use of the rigid TPU application.

The process to produce the TPU polymer of this invention can utilize conventional TPU manufacturing equipment. The hydroxyl terminated polyether intermediate, the diisocyanate, the saturated chain extender and the unsaturated chain extender, are generally added together and reacted in accordance with standard polyurethane synthesis methodology. Typically, the TPU forming components of the present invention are melt polymerized in a suitable mixer, such as an internal mixer known as a Banbury mixer, or in an extruder. In one process, the hydroxyl terminated polyether intermediate is blended with the glycol chain extender and added to the extruder as a blend. The diisocyanate is added separately to the extruder. Suitable processing or polymerization starting temperatures of the diisocyanate are from about 100° C. to about 200° C. in one aspect, and from about 100° C. to about 150° C. in another aspect. Suitable processing or polymerization starting temperatures of the blend of the hydroxyl terminated polyether intermediate and the chain extender are from about 100° C. to about 220° C. in one aspect, and from about 150° C. to 200° C. in a further aspect. Suitable mixing times in order to enable the various components to react and form the TPU polymers of the present invention are generally from about 2 to about 10 minutes in one aspect, and from about 3 to about 5 minutes in another aspect.

A process to produce the TPU of this invention is the process referred to as the one-shot polymerization process. In the one-shot polymerization process which generally occurs in situ, a simultaneous reaction occurs between three components, that is the one or more hydroxyl terminated polyether intermediates, the glycol, and the diisocyanate. The reaction is generally initiated at a temperature of from about 90° C. to about 120° C. Inasmuch as the reaction is exothermic, the reaction temperature generally increases to about 220° C. to 250° C. In cases where ethylene glycol is used as the chain extender, it is important to limit the temperature of this exothermic reaction to a maximum of 235° C. to prevent undesired levels of foam formation. The TPU polymer will exit the reaction extruder and be pelletized. The pellets of TPU are normally stored in a heated vessel to continue the reaction and to dry the TPU pellets.

It is often desirable to utilize catalysts such as stannous and other metal carboxylates as well as tertiary amines. Examples of metal carboxylate catalysts include stannous octoate, dibutyltin dilaurate, phenyl mercuric propionate, lead octoate, iron acetylacetonate, magnesium acetylacetonate, and the like. Examples of tertiary amine catalysts include triethyleneamine, and the like. The amount of the one or more catalysts is low, generally from about 50 to about 100 parts by weight per million parts by weight of the end TPU polymer formed.

The weight average molecular weight (Mw) of the TPU polymer, before being crosslinked, of the present invention range from about 90,000 to about 600,000 Daltons in one aspect, from about 100,000 to about 300,000 Daltons in another aspect, and from about 120,000 to about 250,000 Daltons in a further aspect. The Mw of the TPU polymer is measured according to gel permeation chromatography (GPC) against polystyrene standard.

When a higher molecular weight TPU polymer is desired, it can be achieved by using a small amount of a cross linking agent having an average functionality greater than 2.0 to induce cross linking. The amount of cross linking agent used is less than 2 mole percent of the total moles of chain extender in one aspect, and less than 1 mole percent in another aspect. One method to increase the molecular weight in a TPU polymer is to replace less than 1 mole percent of the chain extender with trimethylolpropane (TMP).

The cross linking is accomplished by adding a cross linking agent having an average functionality greater than 2.0 together with the hydroxyl terminated intermediate, the isocyanate compound, and chain extender in the reaction mixture to manufacture the TPU polymer. The amount of cross linking agent used in the reaction mixture to make the TPU polymer will depend on the desired molecular weight and the effectiveness of the particular cross linking agent used. Usually, less than 2.0 mole percent in one aspect, and less than 1.0 mole percent in another aspect, based on the total moles of chain extender used in making the TPU polymer are used. Levels of cross linking agent greater than 2.0 mole percent, based on the total moles of chain extender would be difficult to melt process. Therefore, the level of cross linking agent used is from about 0.05 mole percent to about 2.0 mole percent based on the total moles of chain extender.

The cross linking agents can be any monomeric or oligomeric materials which have an average functionality of greater than 2.0 and have the ability to cross link the TPU polymer. Such materials are well known in the art of thermoset polyurethanes. In one aspect cross linking agents include trimethylolpropane (TMP) and pentaerythritol. Trimethylolpropane has been found to particularly be a desirable cross linking agent.

The TPU polymers of the present invention can be mixed with various conventional additives or compounding agents, such as plasticizers, fillers, extenders, pigments, lubricants, UV absorbers, flame retardants, and the like. Fillers that can be used include talc, silicates, clays, calcium carbonate, and the like. The level of conventional additives will depend on the final properties and cost of the desired end-use application, as is well known to those skilled in the art of compounding TPUs. The additives may be added during the reaction to form the TPU, but are normally added in a second compounding step.

The TPUs of this invention can be used in manufacturing a wide variety of consumer and industrial products having an improved level of heat, chemical, and solvent resistance. This is accomplished by melt processing the TPU into the desired structure and then exposing it to electron beam irradiation to crosslink it into a thermoset of that design. Virtually any melt processing method can be used to process the TPU into a desired uncured structure. The TPU can be melt processed by extrusion, injection molding, compression molding, casting, melt spinning, film blowing, thermoforming, blow molding, and the like. For instance, the TPU can be extruded into a tube or hose of virtually any diameter. It can also be molded into the shape of a seal or gasket. After being formed into a desired shape the uncured TPU is then exposed to electron beam irradiation to crosslink it into a permanent cured structure.

The TPU of this invention can beneficially be used to coat electrical wires that are exposed to elevated temperatures and organic solvents. This can be done by applying the TPU of this invention to the bare metal wire being coated utilizing a tubing type cross-head die. The metal will typically be aluminum or copper. In order to improve the adhesion between the TPU being applied and the bare wire, the bare wire is generally preheated before it enters the tubing type cross-head die.

A vacuum is generally applied to the die cavity in the tubing type cross-head die in order to cause the tube of thermoplastic composition being extruded from the die to uniformly contract onto the bare wire as it exits the tubing type cross-head die. The amount of vacuum or partial vacuum that needs to be applied to the die cavity in order to facilitate bringing the newly formed tube of extruded thermoplastic composition into proper contact with the metal wire will be determined by a number of factors, such as, the speed that the bare metal wire is exiting the tubing type cross-head die, the thickness of the coating being applied, the diameter of the metal wire, and the dimensions of the tubing type cross-head die. Those persons skilled in the art will be able to ascertain the amount of vacuum that is optimally needed in their particular process.

By utilizing the process of this invention, bare metal wires can be coated at relatively high speeds. It will generally be desirable to coat wires at relatively high speeds due to economic considerations. Generally, wire will be treated at a rate of from about 20 meters per minute up to about 500 meters per minute. Normally, the wire being coated will travel through the tubing type cross-head die at a speed of from about 100 meters per minute up to about 400 meters per minute. The exact speed at which the wire can optimally be coated can be determined by persons skilled in the art using standard engineering practice and will depend on the nature and design of the equipment being used, the thickness and type of wire being coated, and the thickness of the coating being applied. It should be noted that the tube of TPU being extruded from the tubing type cross-head die will be extruded at a speed that is less than that at which the bare metal wire is exiting the tubing type cross-head die.

The tubing type cross-head die can be designed to coat wires with the TPU composition to any desired thickness. Normally wires which will be manufactured into magnet wires will be coated to a thickness between about 10 microns and about 100 microns. Normally, standard magnet wires having a diameter of about 1 millimeter are coated to a thickness in the range of 15 microns to 35 microns. Magnet wires having reinforced insulation generally have a coating thickness of 30 microns to 50 microns. As a general rule, the coating thickness on a magnet wire will be less than about 5 percent of the diameter of the bare metal filament in the magnet wire.

An apparatus which can be used to coat metal wire with the TPU of this invention to make coated electrical wire is illustrated in FIG. 1. The apparatus 10 generally consists of a filament payout device 11, a filament preheater 12, and extruder 13 equipped with a tubing type cross-head die 14, a quench bath 15, an electron beam source 19, and a filament take-up device 16. As shown in FIG. 1, the bare wire filament 17 and the coated wire 18 are broken at points 19 and 20. At the bare wire filament break 19', when this apparatus is used to manufacture magnet wire, conventional wire drawing equipment can be installed. Thus, an oversized bare wire filament 17 can be reduced to the desired size by utilizing drawing equipment prior to coating the bare wire filament. The filament preheater 12 in a specific embodiment of the process of this invention can include an annealer whereby the affects of drawing the bare wire filament or stretching it can be eliminated. In other specific embodiments in which the apparatus 10 is being used to manufacture coated wire 18, additional coating devices and hardeners can be inserted at break point 20' so that successive coats of various coating materials can be applied to the previously coated wire in a continuous manner.

The filament pay-out device 11 includes a spool 21 on which the bare wire filament 17 is stored. The spool 21 is mounted on a spindle 22 of the pay-out device 11 so as to rotate freely in the direction of arrow 20. Operatively associated with the spool 21 is a brake 23 which restrains the rotation of spool 21 as the bare metal wire filament 17 is being pulled therefrom by the filament take-up device 16 so as to prevent entanglements. In accordance with the process of this invention, it is highly possible that in an apparatus used for the commercial manufacture of electrical wire where bare wire filaments are being rolled, drawn or otherwise reduced in size, the filament pay-out device 11 can be completely eliminated, since the remaining apparatus can be used to coat bare wire filament 17 continuously in a single pass as the bare wire filament is supplied from such a rolling and drawing device. The spool 21 in this instance can be replaced with one or more reels upon which bare wire filament is transported from the rolling and drawing operation to the filament preheater 12. In instances where the filament pay-out device 11 is eliminated and rolling and drawing equipment are substituted therefor, it is important for an annealer to be included at point 19 in order to eliminate the effects of working the bare wire filament during the rolling and drawing operations. In such an operation depending upon the temperature at which the bare wire filament 17 left the annealer, it is possible to eliminate the need for the filament preheater 12. The filament preheater 12 is used solely to raise the temperature of the bare wire filament 17 prior to the application of the coating material (TPU) by the tubing type cross-head die 14. In the specific embodiment of this invention illustrated in FIG. 1, the device used to preheat the bare wire filament is filament preheater 12. However, in other embodiments of the process of this invention, an annealer could be used to preheat the bare wire filament. The filament preheater 12 can be designed so as to heat the bare wire filament by passing it over hot rollers. In another embodiment, the filament preheater 12 can be designed to heat the bare wire filament by simply containing an electrical resistance coil preferably of tubular shape through which the bare wire filament travels before going to the tubing type cross-head die 14.

The extruder 13 will normally be equipped with a material reservoir 24 for storing the TPU composition which will be used to coat the bare metal wire filament. It will also generally be equipped with a pump 25 for transporting the TPU composition from material reservoir 24 into the tubing type cross-head die 14. Pump 25 will usually be driven by a pump motor 26. Vacuum can be applied to the die cavity through a vacuum line 27. If so desired, a vacuum pump can be connected directly to the tubing type cross-head die 14.

The tubing type cross-head die 14 is more clearly illustrated in FIG. 2 and FIG. 3. The die cavity 28 through which the bare wire filament 17 travels extends throughout the entire length of the tubing type cross-head die. The TPU composition 30 used to coat the bare wire filament 17 is pumped into the tube extrusion cavity 29. The bare wire filament enters into the die cavity 28 at the entrance opening 31 of the die cavity and exits the die at the exit opening 32. The TPU composition 30 exits the tubing type cross-head die at the tubing exit opening 33. After the TPU composition exits the tubing type cross-head die through the tubing exit opening 33, it collapses upon and around the bare metal wire coating it uniformly. The tube of TPU composition is extruded in such a way that it surrounds the bare metal wire which is exiting the tubing type cross-head die and collapses upon it due to the vacuum being applied to the die cavity 28 through vacuum line 27. This collapsing of the extruded tube of the TPU onto the wire filament 17 is also caused by the adhesion of the TPU composition to the bare metal wire being extruded. Due to the fact that the bare metal wire is exiting the die at a higher speed then that at which the thermoplastic composition is exiting the die as a tube which surrounds the bare metal wire, the tube of thermoplastic composition is stretched and oriented as it is being applied to the wire.

In the embodiment of this invention illustrated in FIG. 1, the hot coated wire 18 which has left the tubing type cross-head die 14 is rapidly cooled in a quench bath 15. Such a quench bath is not an essential element of the apparatus. For example, the newly coated wire 18 could be allowed to cool simply by air cooling it for a sufficient length of time. However, since high speed is normally desirable a quench bath will normally be utilized. The quench bath will normally utilize a cooling fluid, such as water. The quench bath can optionally contain various conditioners or dyes as desired.

Before or after being quenched, the coated wire is exposed to electron beam irradiation provided by an electron beam source 19. The electron beam treatment is provided at an intensity and for a time period that is sufficient to attain the desired level of crosslinking needed to cure the TPU coating to the proper degree.

The take-up device 16, in many respects is similar to the pay-out device 11. The take-up device 16 comprises a reel 21 on which the coated wire 18 is spooled for shipment. Reel 21 can be a conventional spool on which the coated wire is shipped. Spools 21 are mounted for rotation on a spindle 22 so as to be driven in the direction of arrow 34. Operatively connected to the spool 21 is a motor 35 which drives the spool 21 and thereby pulls the bare wire filament 17 and coated wire 18 from the spool or reel 21 of the pay-out device 11 ultimately to the filament take-up device 16.

The TPU compositions of this invention, because of their flame retardant properties, abrasion resistance and good tensile strength, are particularly suited for use as jacketing for electrical conductors in wire and cable construction applications, such as jacketing for armored cable, industrial robotic equipment, non-metallic sheath cable, deep well pump cables and other multiple conductor assemblies. A typical wire and cable construction will have at least one and typically will have multiple electrical conductors, usually from 2 to 8 conductors, such as copper wires. Each conductor will typically be coated, normally by extrusion, with a thin layer of polymeric insulation compound which can be TPU, polyvinyl chloride, polyethylene, cross-linked polyethylene, fluorocarbon polymers, and the like. The multiple insulated conductors may be wrapped with metal, a fiberglass or other non-flammable textile. The multiple conductors are then encased in a jacket material (i.e., the TPU composition of this invention) to protect the electrical conductors. In most wire and cable end-use applications, it is necessary for this jacket material to be flame resistant in case a fire occurs.

Flame retardants used in TPU wire and cable applications are well known in the literature and the art. Exemplary flame retardants include non-halogen flame retardants, such as melamine, melamine derivatives, such as melamine cyanurate, organic phosphates, organic phosphonates, and phosphorous containing compounds. Halogenated flame retardants, such as chlorinated and brominated compounds, may also be used. Inorganic compounds such as aluminum trihydrate, antimony oxide, ammonium phosphate, ammonium polyphosphate, calcium carbonate, clay, and talc may also be used as flame retardants. Often more than one flame retardant is used and frequently 3 or more flame retardants are combined in the TPU formulation.

When used as a wire and cable jacket, the TPU of this invention would be extruded onto the wire bundle and subsequently crosslinked by exposure to e-beam radiation to form a crosslinked jacket.

This invention is illustrated by the following examples that are merely for the purpose of illustration and are not to be regarded as limiting the scope of the invention or the manner in which it can be practiced. Unless specifically indicated otherwise, parts and percentages are given by weight.

Examples 1 to 6 illustrate the synthesis of a hydroxyl terminated intermediate that contains carbon-carbon double bonds. In these examples an unsaturated polyester diol intermediate is synthesized.

Example 1

To a three-neck glass reactor equipped with a over-head mechanical stirrer, thermometer, column condenser, and receiver is added 232.23 g (1.59 moles) of adipic acid (AA), 160.38 g (1.78 moles) of 1,4-butanediol (BDO) and 8.07 g (0.046 moles) of trimethylolpropane mono allyl ether (TMPME). The reaction medium is heated to 150° C. to 190° C. at ambient pressure (5-6 hours) and the generated water was collected. Then 100 ppm of transesterification catalyst tetra-(2-ethylhexyl)titanate is added and a vacuum (0-15 mmHg) is applied while the reaction medium is heated to 190° C. to 200° C. The generated water was removed until the acid number becomes less than 0.5 (3-5 hours). The final polyol has hydroxyl number of 62.21 (~Mn of 1803.6 g/mole).

Example 2

To a three-neck glass reactor equipped with a over-head mechanical stirrer, thermometer, column condenser, and receiver is added 212.66 g (1.46 moles) of adipic acid (AA), 141.98 g (1.58 moles) of 1,4-butanediol (BDO) and 16.69 g (0.096 moles) of trimethylolpropane mono allyl ether (TMPME). The reaction medium is heated to 150° C. to 190° C. at ambient pressure (5-6 hours) and the generated water was collected. Then 100 ppm of transesterification catalyst tetra-(2-ethylhexyl)titanate is added and a vacuum (0-15 mmHg) is applied while the reaction medium is heated to 190° C. to 200° C. The generated water was removed until the acid number becomes less than 0.5 (3-5 hours). The final polyol has hydroxyl number of 47.50 (~Mn of 2361.9 g/mole).

Example 3

To a three-neck glass reactor equipped with a over-head mechanical stirrer, thermometer, column condenser, and receiver is added 240.18 g (1.65 moles) of adipic acid (AA), 149.34 g (1.66 moles) of 1,4-butanediol (BDO) and 38.93 g (0.22 moles) of trimethylolpropane mono allyl ether (TMPME). The reaction medium is heated to 150° C. to 190° C. at ambient pressure (5-6 hours) and the generated water was collected. Then 100 ppm of transesterification catalyst tetra-(2-ethylhexyl)titanate is added and a vacuum (0-15 mmHg) is applied while the reaction medium is heated to 190° C. to 200° C. The generated water was removed until the acid number becomes less than 0.5 (3-5 hours). The final polyol has hydroxyl number of 83.45 (~Mn of 1344.58 g/mole).

Example 4

To a three-neck glass reactor equipped with a over-head mechanical stirrer, thermometer, column condenser, and receiver is added 220.89 g (1.51 moles) of adipic acid (AA), 116.08 g (1.29 moles) of 1,4-butanediol (BDO) and 81.07 g (0.47 moles) of trimethylolpropane mono allyl ether (TMPME). The reaction medium is heated to 150° C. to 190° C. at ambient pressure (5-6 hours) and the generated water was collected. Then 100 ppm of transesterification catalyst tetra-(2-ethylhexyl)titanate is added and a vacuum (0-15 mmHg) is applied while the reaction medium is heated to 190° C. to 200° C. The generated water was removed until the acid number becomes less than 0.5 (3-5 hours). The final polyol has hydroxyl number of 68.12 (~Mn of 1647.1 g/mole).

Example 5

To a three-neck glass reactor equipped with a over-head mechanical stirrer, thermometer, column condenser, and receiver is added 204.14 g (1.40 moles) of adipic acid (AA) and 295.86 g (1.70 moles) of trimethylolpropane mono allyl ether (TMPME). The reaction medium is heated to 150° C. to 190° C. at ambient pressure (5-6 hours) and the generated water was collected. Then 100 ppm of transesterification catalyst tetra-(2-ethylhexyl)titanate is added and a vacuum (0-15 mmHg) is applied while the reaction medium is heated to 190° C. to 200° C. The generated water was removed until the reaction is monitored by following the acid number (7 hours). The final polyol has acid number of 4.98 and hydroxyl number of 67.42 (~Mn of 1664.2 g/mole. Further reaction to decrease the acid number below 0.5 range resulted gelation.

Example 6

To a three-neck glass reactor equipped with a over-head mechanical stirrer, thermometer, column condenser, and receiver is added 417.32 g (2.86 moles) of adipic acid (AA), 325.04 g (3.063 moles) of diethylene glycol (DEG) and 38.47 g (0.22 moles) of trimethylolpropane mono allyl ether (TMPME). The reaction medium is heated to 150° C. to 190° C. at ambient pressure (5-6 hours) and the generated water was collected. Then 100 ppm of transesterification catalyst tetra-(2-ethylhexyl)titanate is added and a vacuum (0-15 mmHg) is applied while the reaction medium is heated to 190° C. to 200° C. The generated water was removed until the acid number becomes less than 0.5 (3-5 hours). The final polyol has hydroxyl number of 68.00 (~Mn of 1650.0 g/mole).

Examples 7-14

Examples 7 to 14 illustrate crosslinkable TPUs synthesized with unsaturation present only in the chain extender (hard segment). In these examples, a typical high temperature melt polymerization is used to make the TPUs synthesized from the components set forth in Table 1 below. The polyol glycol(s) is melted at 120° C. and blended with the chain extender(s). The blend is mixed with molten 4,4'-diphenylmethane diisocyanate (MDI) and reacted at an initial temperature of 190° C. The TPU polymerization reaches completion in 3 to 4 minutes. Compression molded plaques are molded from the TPU and cut into smaller pieces weighing 1-2 grams and subjected to Soxhlet extraction in THF (tetrahydrofuran) and solvent dissolution in NMP (N-methylpyrrolidone) to determine whether the TPU is soluble in these solvents.

In the THF Soxhlet extraction procedure, the TPU sample is immersed in the solvent and extraction was conducted at reflux for 6 hours. After the extraction the sample is first placed in water to remove the residual solvent and then placed in a convection oven at 105° C. until constant weight is obtained indicating that all solvent has been removed. If the sample dissolved or has a crosslink density (CD) value less than 60% the THF solubility is rated as soluble, an indication of no or insufficient crosslinking being present. If the CD value was more than 60% the sample is rated as insoluble an indication of the presence of crosslinking. The CD values are calculated using the following equation:

$$CD = 100 \times (1 - [(W_i - W_f)/W_i])$$

wherein $W_i$ and $W_f$ are the initial and final dry weight of the sample before and after Soxhlet extraction, respectively. Since the samples are not irradiated crosslinking is nil resulting in no solvent resistance. The results are set forth in Table 1.

For the determination of solubility in NMP, 1-2 gram samples of the TPU are immersed in NMP for 7 days. After 7 days, if the sample is completely dissolved, it is rated as soluble. If the sample does not dissolve, it is removed from solution and placed in water to remove excessive solvent and then placed in a convection oven at 140° C. for 4 hours to remove any residual solvent. Samples that are observed to exhibit brittle properties are rated as insoluble.

mixed with molten 4,4'-diphenylmethane diisocyanate (MDI) and reacted at an initial temperature of 190° C. The TPU polymerization reaches completion in 3 to 4 minutes. Compression molded plaques are molded from the TPU and cut into smaller pieces for solubility testing in THF and NMP as set forth in Examples 7-14. The results are set forth in Table 2.

TABLE 2

| | Example No. | | | | | |
|---|---|---|---|---|---|---|
| Component (g) | 15 | 16 | 17 | 18 | 19 | 20 |
| MDI[1] | 55.60 | 55.62 | 73.07 | 62.42 | 69.04 | 76.84 |
| PTMEG 1000[2] | | | 104.86 | | | |
| Polyol of Ex. 3 | 133.30 | | | | | |
| Polyol of Ex. 4 | | 131.56 | 5.52 | 11.05 | 5.54 | 4.94 |
| P(TMA/HMA)G[3] | | | | 209.98 | | |
| Poly-(caprolactone)[4] | | | | | | 93.87 |
| PCARB[5] | | | | | 105.44 | |
| 1,4-Butanediol | 11.08 | 12.82 | 16.56 | 14.29 | 19.97 | 23.16 |
| Solubility in THF[6] | Gel | Gel | Soluble | Soluble | Soluble | Soluble |
| Solubility in NMP[7] | Gel | Gel | Soluble | Soluble | Soluble | Soluble |

[1]MDI 4,4'-diphenylmethane diisocyanate (molecular wt. 250.4 g/mole)
[2]PTMEG 1000 Poly(tetramethylene ether) glycol (molecular wt. 1000 g/mole)
[3]P(TMA/HMA)G Poly(tetramethylene-co-hexamethylene adipate) glycol (molecular wt. 2500 g/mole)
[4]Poly(caprolactone) Polyol (molecular wt. 2000 g/mole)
[5]PCARB Poly(hexamethylene carbonate) glycol (molecular wt. 2000 g/mole)
[6]THF Tetrahydrofuran solvent
[7]NMP N-methylpyrrolidone solvent

TABLE 1

| | Example No. | | | | | | | |
|---|---|---|---|---|---|---|---|---|
| Component (g) | 7 | 8 | 9 | 10 | 11 | 12 | 13 | 14 |
| MDI[1] | 68.49 | 68.49 | 73.60 | 62.42 | 76.84 | 69.94 | 169.09 | 78.03 |
| PTMEG 1000[2] | 116.90 | 115.00 | | | | | | |
| PTMAG[3] | | | 109.22 | | | | | |
| P(TMA/HMA)G[4] | | | | 219.20 | | | | |
| Poly(caprolactone)[5] | | | | | 96.11 | | | 123.05 |
| PCARB[6] | | | | | | 108.72 | | |
| 1,4-Butanediol | 13.64 | 12.58 | 13.06 | 12.90 | 20.67 | 18.16 | | |
| 1,6-Hexanediol | | | | | | | 77.40 | |
| HQEE[7] | | | | | | | | 43.36 |
| TMPME[8] | 0.96 | 3.92 | 4.12 | 3.23 | 5.17 | 4.10 | 3.55 | 5.47 |
| Solubility in THF[9] | Soluble | Soluble | Soluble | Soluble | Soluble | Soluble | Soluble | Soluble |
| Solubility in NMP[10] | Soluble | Soluble | Soluble | Soluble | Soluble | Soluble | Soluble | Soluble |

[1]MDI 4,4'-diphenylmethane diisocyanate (molecular wt. 250.4 g/mole)
[2]PTMEG 1000 Poly(tetramethylene ether) glycol (molecular wt. 1000 g/mole)
[3]PTMAG Poly(tetramethylene adipate) glycol (molecular wt. 870 g/mole)
[4]P(TMA/HMA)G Poly(tetramethylene-co-hexamethylene adipate) glycol (molecular wt. 2500 g/mole)
[5]Poly(caprolactone) Polyol (molecular wt. 2000 g/mole)
[6]PCARB Poly(hexamethylene carbonate) glycol (molecular wt. 2000 g/mole)
[7]HQEE Hydroquinone bis(2-hydroxyethyl) ether (molecular wt. 198.2 g/mole)
[8]TMPME Trimethylolpropane monoallyl ether (molecular wt. 175 g/mole)
[9]THF Tetrahydrofuran solvent
[10]NMP N-methylpyrrolidone solvent Examples 15-20

Examples 15 to 20 illustrate crosslinkable TPUs synthesized with unsaturation present only in the hydroxyl terminated polyester polyol intermediate (soft segment). In these examples, a typical high temperature melt polymerization is used to make the TPUs synthesized from the components set forth in Table 2 below. The polyol glycol(s) is melted at 120° C. and blended with the chain extender(s). The blend is Examples 21-34

Examples 21 to 34 illustrate crosslinkable TPUs synthesized with unsaturation present in the chain extender (hard segment) and in the hydroxyl terminated polyester polyol intermediate (soft segment). In these examples, a typical high temperature melt polymerization is used to make the TPUs synthesized from the components set forth in Tables 3 and 4 below. The polyol glycol(s) is melted at 120° C. and blended with the chain extender(s). The blend is mixed with molten 4,4'-diphenylmethane diisocyanate (MDI) and reacted at and initial temperature of 190° C. The TPU polymerization reaches completion in 3 to 4 minutes. Compression molded plaques are molded from the TPU and cut into smaller pieces for solubility testing in THF and NMP as set forth in Examples 7-14. The results are set forth in Tables 3 and 4.

the CD values are in the 55% to 66% range for the samples irradiated with 10 MR and 85% to 97% range for the samples irradiated with 20 MR and higher e-beam doses. All of the non-irradiated samples as well as the irradiated control polymers are soluble in THF and NMP indicating that no crosslinking occurred. The results are set forth in Table 5.

TABLE 3

| | Example No. | | | | | |
|---|---|---|---|---|---|---|
| Component (g) | 21 | 22 | 23 | 24 | 25 | 26 |
| MDI[1] | 69.00 | 69.04 | 73.07 | 71.57 | 71.55 | 73.95 |
| PTMEG 1000[2] | 108.61 | 111.05 | 102.86 | 86.26 | 75.09 | |
| Polyol of Ex. 2 | 5.72 | | | | | 101.01 |
| Polyol of Ex. 3 | | 3.43 | | | | |
| Polyol of Ex. 4 | | | 5.42 | 21.56 | 32.18 | |
| 1,4-Butanediol | 12.78 | 12.62 | 14.74 | 12.41 | 12.73 | 20.70 |
| TMPME[3] | 3.86 | 3.86 | 3.94 | 8.27 | 8.49 | 4.15 |
| Solubility in THF[4] | Soluble | Soluble | Soluble | Soluble | Soluble | Gel |
| Solubility in NMP[5] | Soluble | Soluble | Soluble | Soluble | Soluble | Gel |

[1]MDI 4,4'-diphenylmethane diisocyanate (molecular wt. 250.4 g/mole)
[2]PTMEG 1000 Poly(tetramethylene ether) glycol (molecular wt. 1000 g/mole)
[3]TMPME Trimethylolpropane monoallyl ether (molecular wt. 175 g/mole)
[4]THF Tetrahydrofuran solvent
[5]NMP N-methylpyrrolidone solvent

TABLE 4

| | Example No. | | | | | | | |
|---|---|---|---|---|---|---|---|---|
| Component (g) | 27 | 28 | 29 | 30 | 31 | 32 | 33 | 34 |
| MDI[1] | 68.94 | 68.91 | 55.54 | 41.62 | 76.84 | 42.95 | 43.02 | 69.79 |
| Polyol of Ex. 3 | 17.31 | | 132.01 | | | | | |
| Polyol of Ex. 4 | | 17.28 | | 7.31 | 4.81 | 28.88 | 43.42 | 5.44 |
| PTMAG[2] | 98.10 | 97.90 | | | | | | |
| P(TMA/HMA)G[3] | | | | 138.98 | | 115.54 | 101.32 | |
| Poly(caprolactone)[4] | | | | | 91.36 | | | |
| PCARB[5] | | | | | | | | 103.38 |
| 1,4-Butanediol | 11.67 | 11.93 | 9.90 | 8.48 | 20.62 | 7.23 | 7.04 | 18.05 |
| TMPME[6] | 3.86 | 3.86 | 2.47 | 2.12 | 5.16 | 4.82 | 4.69 | 4.10 |
| Solubility in THF[7] | Soluble | Soluble | Soluble | Soluble | Soluble | Soluble | Soluble | Soluble |
| Solubility in NMP[8] | Soluble | Soluble | Soluble | Soluble | Soluble | Soluble | Soluble | Soluble |

[1]MDI 4,4'-diphenylmethane diisocyanate (molecular wt. 250.4 g/mole)
[2]PTMAG Poly(tetramethylene adipate) glycol (molecular wt. 870 g/mole)
[3]P(TMA/HMA)G Poly(tetramethylene-co-hexamethylene adipate) glycol (molecular wt. 2500 g/mole)
[4]Poly(caprolactone) Polyol (molecular wt. 2000 g/mole)
[5]PCARB Poly(hexamethylene carbonate) glycol (molecular wt. 2000 g/mole)
[6]TMPME Trimethylolpropane monoallyl ether (molecular wt. 175 g/mole)
[7]THF Tetrahydrofuran solvent
[8]NMP N-methylpyrrolidone solvent Examples 35-46

In many instances, the solvent resistance of a polymer is related to its crosslink density. Generally, non-crosslinked polymers are prone to solvent attack (e.g., are soluble or partially soluble in a particular solvent system). Crosslinked polymers are commonly resistant to solvent attack. In these examples, compression molded plaques are molded from selected TPUs synthesized in Examples 7 to 34 and are subsequently irradiated with 10 to 60 MRad (MR) dosages of e-beam radiation. As a control, commercially available TPUs containing no crosslinkable unsaturated moieties are similarly molded and irradiated. The irradiated plaques were cut into 1-2 gram samples and subjected to solvent testing in THF and NMP as set forth in Examples 7 to 14. Generally,

TABLE 5

| Ex. No. | Polymer Ex. No. | Radiation Dose (MR) | THF Solubility | NMP Solubility |
|---|---|---|---|---|
| Control 1 | Estane® 58315 TPU[1] | 0 | Y | Y |
| | | 10 | Y | Y |
| | | 20 | Y | Y |
| Control 2 | Estane® 58271 TPU[2] | 0 | Y | Y |
| | | 10 | Y | Y |
| | | 20 | Y | Y |
| 35 | 7 | 0 | Y | Y |
| | | 10 | Y | Y |
| | | 20 | N | N |
| 36 | 8 | 0 | Y | Y |
| | | 10 | N | N |
| | | 20 | N | N |
| 37 | 9 | 0 | Y | Y |
| | | 10 | N | N |
| | | 20 | N | N |
| | | 30 | N | N |
| | | 40 | N | N |
| | | 50 | N | N |
| | | 60 | N | N |

TABLE 5-continued

| Ex. No. | Polymer Ex. No. | Radiation Dose (MR) | THF Solubility | NMP Solubility |
|---|---|---|---|---|
| 38 | 10 | 0 | Y | Y |
| | | 10 | N | N |
| | | 20 | N | N |
| | | 30 | N | N |
| | | 40 | N | N |
| | | 50 | N | N |
| | | 60 | N | N |
| 39 | 11 | 0 | Y | Y |
| | | 30 | N | N |
| | | 40 | N | N |
| | | 50 | N | N |
| | | 60 | N | N |

TABLE 5-continued

| Ex. No. | Polymer Ex. No. | Radiation Dose (MR) | THF Solubility | NMP Solubility |
|---|---|---|---|---|
| 40 | 12 | 0 | Y | Y |
|  |  | 30 | N | N |
|  |  | 40 | N | N |
|  |  | 50 | N | N |
|  |  | 60 | N | N |
| 41 | 17 | 30 | N | N |
|  |  | 40 | N | N |
|  |  | 50 | N | N |
|  |  | 60 | N | N |
| 42 | 19 | 0 | Y | Y |
|  |  | 30 | N | N |
|  |  | 40 | N | N |
|  |  | 50 | N | N |
|  |  | 60 | N | N |
| 43 | 20 | 0 | Y | Y |
|  |  | 30 | N | N |
|  |  | 40 | N | N |
|  |  | 50 | N | N |
|  |  | 60 | N | N |
| 44 | 23 | 0 | Y | Y |
|  |  | 30 | N | N |
|  |  | 40 | N | N |
|  |  | 50 | N | N |
|  |  | 60 | N | N |
| 45 | 30 | 0 | Y | Y |
|  |  | 30 | N | N |
|  |  | 40 | N | N |
|  |  | 50 | N | N |
|  |  | 60 | N | N |
| 46 | 34 | 0 | Y | Y |
|  |  | 30 | N | N |
|  |  | 40 | N | N |
|  |  | 50 | N | N |
|  |  | 60 | N | N |

[1]Estane® 58315 TPU A polyether based TPU made from MDI, polyether polyol, butanediol, and is commercially available from Lubrizol Advanced Materials, Inc.
[2]Estane® 58271 TPU A polyester based TPU made from MDI, polyester polyol, and butanediol and is commercially available from Lubrizol Advanced Materials, Inc.

Examples 47-48

In these examples compression molded plaques are molded from the TPUs synthesized in Examples 7 and 8 and are subsequently irradiated with 10 and 20 MRad (MR) dosages of e-beam radiation. Dynamic mechanical analysis (DMA) is conducted on the irradiated TPUs in accordance with ASTM D5279-08. As a control, a commercially available TPU containing no crosslinkable unsaturated moieties is similarly tested. The temperature sweep runs are conducted using a dynamic mechanical analyzer in torsion mode with 3° C./min heating rate and at 0.1% strain and 1 Hz frequency.

In addition, creep-recovery measurements are conducted on the irradiated samples using the methodology set forth in ASTM D2990 at 90° C. A constant load of 25,000 Pa is applied to the samples and removed after 60 seconds allowing the sample to recover. The unrecovered deformation after removal of the load is reported as % creep. The data from the DMA and creep recovery analysis are reported in Table 6.

TABLE 6

| Ex. No | Polymer Ex. No. | Radiation Dose (MR) | Tan δ Peak (° C.) | Crossover Temp. (° C.) | Creep (%) |
|---|---|---|---|---|---|
| Control 1 | Estane® 58315 TPU[1] | 0 | −24 | 168 | 55 |
| 47 | 7 | 0 | −20 | 169 | N/T |
|  |  | 10 | −22 | 197 | N/T |
|  |  | 20 | −22 | 220 | N/T |

TABLE 6-continued

| Ex. No | Polymer Ex. No. | Radiation Dose (MR) | Tan δ Peak (° C.) | Crossover Temp. (° C.) | Creep (%) |
|---|---|---|---|---|---|
| 48 | 8 | 0 | −18 | 162 | 40 |
|  |  | 10 | −18 | 225 | 6 |
|  |  | 20 | −18 | None | 5 |

[1]Estane® 58315 TPU A polyether based TPU made from MDI, polyether polyol, butanediol, and is commercially available from Lubrizol Advanced Materials, Inc.

Examples 49-50

E-beam irradiated compression molded plaques (6 in.×6 in.×30 mil) molded from the TPUs of Examples 12 and 34 are placed in a convection oven at 200° C. for 6 hours. After 6 hours, the appearance and physical state of the samples are determined by visual inspection. A commercially available TPU containing no crosslinkable unsaturated moieties is similarly tested. The results are presented in Table 7.

TABLE 7

| Ex. No | Polymer Ex. No. | Radiation Dose (MR) | Apperance |
|---|---|---|---|
| Control 1 | Estane® 58315 TPU[1] | 0 | Melted |
| 49 | 12 | 0 | Melted |
|  |  | 30 | Very Soft |
|  |  | 40 | Elastic Solid |
|  |  | 60 | Elastic Solid |
| 50 | 34 | 0 | Melted |
|  |  | 30 | Very Soft |
|  |  | 40 | Elastic Solid |
|  |  | 60 | Elastic Solid |

[1]Estane® 58315 TPU A polyether based TPU made from MDI, polyether polyol, butanediol, and is commercially available from Lubrizol Advanced Materials, Inc.

Examples 51-52

Percent swell (in accordance with ASTM D471) is measured by placing irradiated specimens of the TPUs synthesized in Examples 23 and 34 in Fuel C and measuring the weight gain/loss after 1 week of immersion in the fuel. Commercially available TPUs containing no crosslinkable unsaturated moieties are similarly tested. The results are set forth in Table 8.

TABLE 8

| Ex. No | Polymer Ex. No. | Radiation Dose (MR) | % Swell in Fuel C (after 1 week) |
|---|---|---|---|
| Control 1 | Estane® 58887 TPU[1] | 0 | 37 |
| Control 2 | Estane® 58219 TPU[2] | 0 | 30 |
| 51 | 23 | 10 | 29 |
|  |  | 20 | 26 |
|  |  | 30 | 21 |
|  |  | 60 | 19 |
| 52 | 34 | 10 | 23 |
|  |  | 20 | 22 |
|  |  | 30 | 20 |
|  |  | 60 | 20 |

[1]Estane® 58887 TPU A polyether based TPU made from MDI, polyether polyol, butanediol, and is commercially available from Lubrizol Advanced Materials, Inc.
[2]Estane® 58219 TPU A polyether based TPU made from MDI, polyether polyol, butanediol, and is commercially available from Lubrizol Advanced Materials, Inc.

What is claimed is:

1. A process for manufacturing a molded article which comprises (a) heating a crosslinkable thermoplastic polyurethane composition to a temperature which is above the melting point of the thermoplastic polyurethane composition, wherein the thermoplastic polyurethane composition is comprised of the reaction product of (1) a hydroxyl terminated intermediate, wherein the hydroxyl terminated intermediate is an unsaturated hydroxyl terminated intermediate of the structural formula:

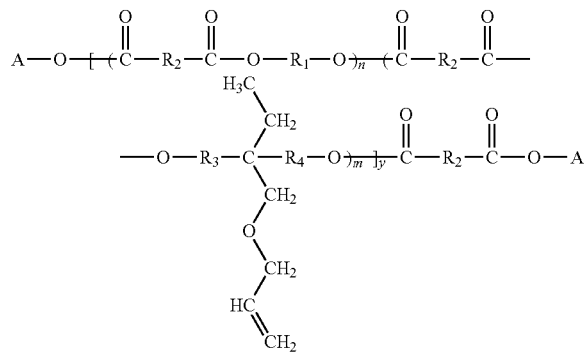

wherein A independently represents —$R_1$OH and a moiety selected from the structure represented as follows:

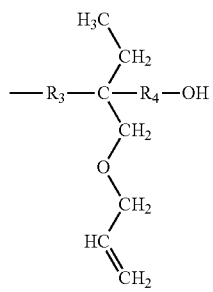

and $R_1$, $R_2$, $R_3$, and $R_4$ can be the same or different and represent divalent linear and branched alkylene moieties that contain from 1 to about 10 carbon atoms, $R_1$ can also represent a divalent ether group represented by —$R_5$—O—$R_5$, wherein $R_5$ independently is selected from a divalent alkylene moiety containing 1 to 5 carbon atoms, the ratio of n:m ranges from about 0 to about 35, and y is an integer ranging from about 1 to about 20, (2) a polyisocyanate, (3) a saturated glycol chain extender, and (4) a glycol chain extender containing carbon-carbon double bonds; (b) injecting the thermoplastic polyurethane composition into a mold; (c) cooling the thermoplastic polyurethane composition in the mold to a temperature which is below the melting point of the thermoplastic polyurethane composition to produce the molded article; (d) removing the molded article from the mold; and (e) exposing the molded article to irradiation to crosslink the thermoplastic polyurethane composition into a thermoset.

2. A process as specified in claim 1 wherein the irradiation is electron beam irradiation.

3. A process for manufacturing a thermoset tube which comprises (a) heating a crosslinkable thermoplastic polyurethane composition to a temperature which is above the melting point of the thermoplastic polyurethane composition, wherein the thermoplastic polyurethane composition is the thermoplastic polyurethane composition specified in claim 1; (b) extruding the thermoplastic polyurethane composition into a hot extruded tube; (c) cooling the hot extruded tube to below the melting point of the thermoplastic polyurethane composition to produce an uncured extruded tube; and (d) exposing the uncured extruded tube to irradiation to crosslink the thermoplastic polyurethane composition into a thermoset and to produce the thermoset tube.

4. A process for manufacturing a coated electrical wire which comprises (a) passing a metal wire through a tubing type cross-head die; (b) extruding a crosslinkable thermoplastic polyurethane composition is the thermoplastic polyurethane composition specified in claim 1, (2) a polyisocyanate, (3) a saturated glycol chain extender, and (4) a glycol chain extender containing carbon-carbon double bonds into a tube which surrounds the metal wire which is exiting the tubing type cross-head die at a speed lower than that at which the wire is exiting the tubing type cross-head die; (c) applying a vacuum to the die cavity so as to cause the tube of thermoplastic polyurethane composition to collapse onto the wire as it exits the tubing type cross-head dye to produce a wire having an uncured coating thereon; and (d) exposing the wire having the uncured coating thereon to irradiation to crosslink the thermoplastic polyurethane composition into a thermoset and to produce the coated electrical wire.

5. A wire and cable construction comprising:
(a) at least one metal conductor wherein said conductor is insulated with a non-conducting polymeric material; and
(b) a jacket covering said insulated metal conductor; wherein said jacket is a crosslinkable thermoplastic polyurethane composition comprising the reaction product of:
(i) at least one polyisocyanate;
(ii) at least one saturated glycol chain extender;
(iii) at least one glycol chain extender containing carbon-carbon double bonds;
(iv) at least one saturated hydroxyl terminated intermediate of the structural formula:

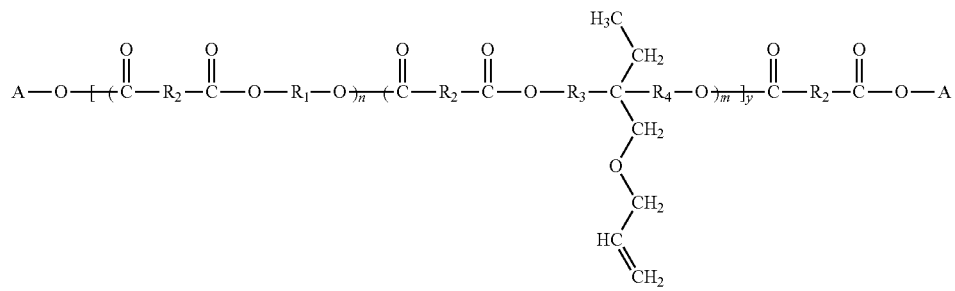

wherein A independently represents —$R_1$OH and a moiety selected from the structure represented as follows:

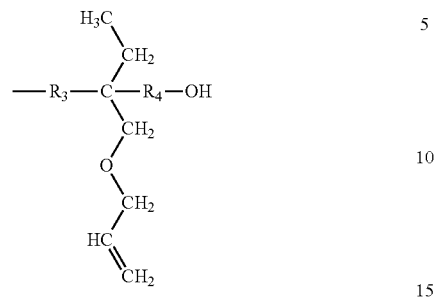

and $R_1$, $R_2$, $R_3$, and $R_4$ can be the same or different and represent divalent linear and branched alkylene moieties that contain from 1 to about 10 carbon atoms, $R_1$ can also represent a divalent ether group represented by —$R_5$—O—$R_5$, wherein $R_5$ independently is selected from a divalent alkylene moiety containing 1 to 5 carbon atoms, the ratio of n:m ranges from about 0 to about 35, and y is an integer ranging from about 1 to about 20;

(v) optionally at least one unsaturated hydroxyl terminated intermediate containing carbon-carbon double bonds.

6. The wire and cable construction of claim 5, wherein said construction has from 2 to 8 insulated metal conductors.

7. The wire and cable construction of claim 5, wherein said thermoplastic polyurethane further comprises at least one flame retardant.

* * * * *